July 30, 1957  R. A. M. RONCERAY  2,800,985
CHAIN HOIST DRIVE MECHANISM
Filed Dec. 20, 1954  2 Sheets—Sheet 1

INVENTOR
ROBERT ANDRÉ MARCEL RONCERAY

July 30, 1957 — R. A. M. RONCERAY — 2,800,985
CHAIN HOIST DRIVE MECHANISM
Filed Dec. 20, 1954 — 2 Sheets-Sheet 2

INVENTOR:
ROBERT ANDRÉ MARCEL RONCERAY
By
ATTORNEYS

United States Patent Office 2,800,985
Patented July 30, 1957

2,800,985

CHAIN HOIST DRIVE MECHANISM

Robert André Marcel Ronceray, Thiais, France

Application December 20, 1954, Serial No. 476,302

Claims priority, application France January 13, 1954

1 Claim. (Cl. 192—4)

My invention has for its object a chain hoist which is novel inasmuch as it includes a unitary casing of which one section carries the control shaft on which is revolubly fitted the load-carrying head while the second section which is mounted eccentrically with reference to the first section, carries an intermediate or stub shaft on which are secured two intermediate wheels of a train of gearwheels forming a single speed reducer, said intermediate wheels controlling respectively a gear rigid with the head and a gear operatively connected with the control shaft.

According to an auxiliary feature of my invention, the pinion operatively connected with the control shaft of the hoist, instead of being obtained in the making of the said control shaft is keyed to the latter while the brake plate instead of being keyed to said control shaft is made in one with the latter which provides inter alia an easier lubrication.

The arrangement of the hoist according to my invention allows reducing considerably the bulk and the height of said hoist, while ensuring a high efficiency of the latter.

The unitary casing is provided advantageously with auxiliary casings and hoods which protect completely the hoist and its auxiliaries against water and other objectionable soiling material. The bearings for the shaft and stub-shaft of the hoist are also perfectly protected.

Figure 1:
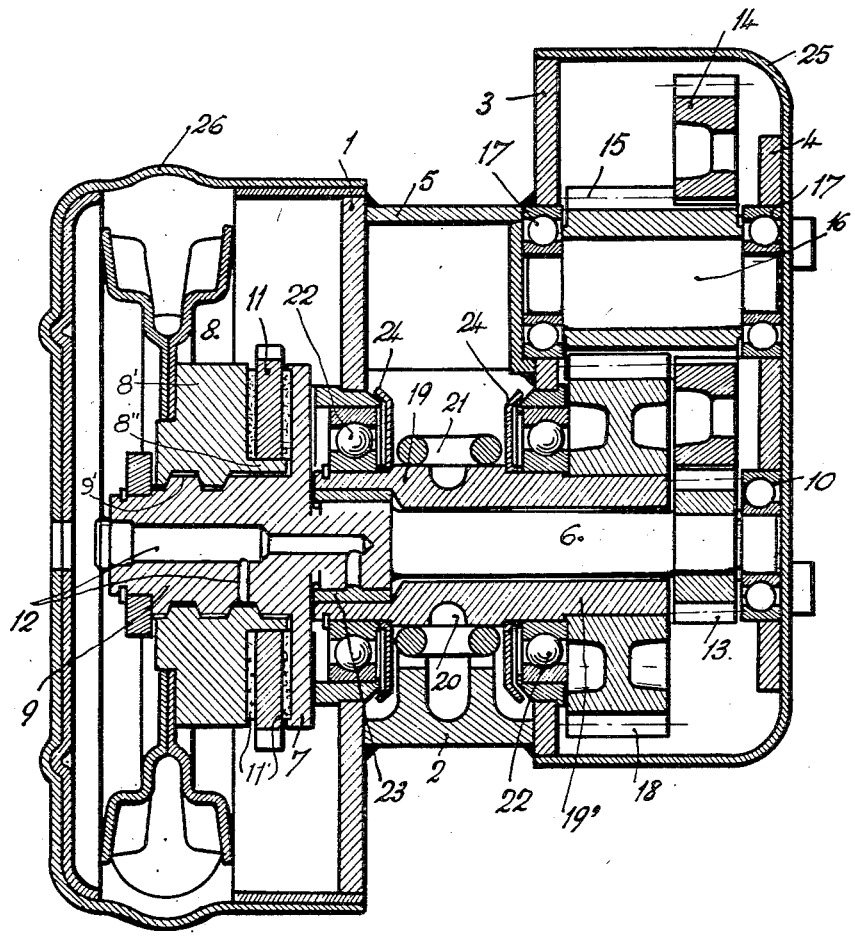
Figure 2:
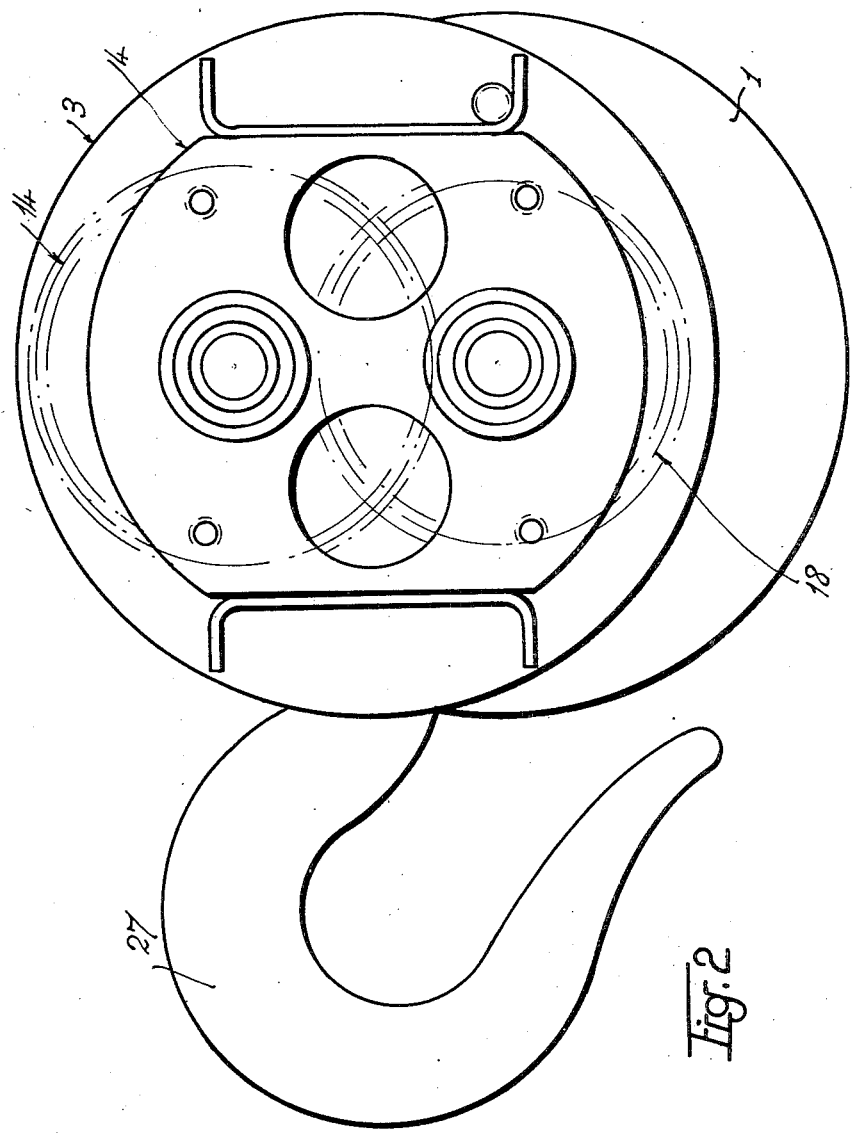

I have illustrated by way of example and by no means in a binding sense a preferred embodiment of my invention in accompanying drawings, wherein:

Fig. 1 is a longitudinal section of the hoist while Fig. 2 is an elevational terminal view thereof after removal of the auxiliary protecting hoods.

The unitary casing of the hoist includes a first section constituted by a flange 1 on the braking side, said flange 1 being rigid with a chain guiding member 2, and a second section constituted by a flange 3 on the gear side and associated with an auxiliary shaft carrying flange 4, said second section being eccentric with reference to the first section.

The two sections of the unitary casing are interconnected by cylindrical members 5. These may form a unit cast in one or else they may include a plurality of parts which are welded together.

A control shaft 6 is rotatably supported at one end by a bearing 10 mounted on the auxiliary flange 4. The opposite end of said shaft is formed integral with a brake flange 7 extending laterally thereof and an end hub 9 having a threaded periphery 9'. A hand wheel 8 has an internally threaded collar 8' fixedly connected thereto with said hub extending through said collar and being in threaded engagement therewith. A ratchet wheel 11 is rotatably mounted on an extension 8" of collar 8' while a pair of friction washers 11' are mounted each on an opposite side of said ratchet wheel with one washer between collar 8' and wheel 11 and the other washer between wheel 11 and brake flange 7. Ratchet wheel 11 is engaged by a pawl (not shown) for limiting its direction of rotation.

Shaft 6 further has lubricating channels 12 for feeding a lubricant to collar 8' and bushing 23.

To the free end of the shaft 6 is keyed a controlling pinion 13 meshing with an intermediate wheel 14 rigid with an intermediate pinion 15 keyed to the stubshaft 16 carried inside ball or roller bearings 17 in the eccentric section of the hoist casing.

The intermediate pinion 15 meshes in its turn with the head gear 18 keyed to a bearing section 19' on the load carrying head 19.

In the example illustrated, said head is provided with only four outer recesses 20 engageable by the links of the hoisting chain 21. 22 designates the ball or roller bearings in which is revolubly carried the load-carrying head 19 which is fitted over the control shaft 6 so as to revolve freely thereon with the interposition of a bushing 23 of suitably treated and trued steel. 24 designates the deflectors protecting the bearings 22 carrying the above mentioned load-carrying head 19.

25 designates the auxiliary gear casing, 26 the casing enclosing the controlling handwheel 3 and 27 the suspension hook of the hoist which is pivotally mounted on the main casing of the latter in the conventional manner.

When the pulley block is employed to raise a load secured to the suspension hook on chain 21, the hand chain (not shown) is pulled in the correct direction. This causes the collar 8' to move along the hub 9 with which it is in threaded engagement until the ratchet wheel 11, which is loosely mounted around the driving shaft 6, is tightly held between the collar 8' and the flange 7. The driving shaft 6 then rotates turning head 19 through the gearing so as to raise the load and the ratchet wheel will move with the shaft 6, clicking over the pawl. In this way the height to which the load is raised may be sustained by said pawl and ratchet wheel.

When the load is to be lowered from its raised position, said hand chain is pulled in the opposite direction, the ratchet wheel 11 is freed since the collar 8' moves away from its along hub 9 and then the weight of the load causes shaft and head to rotate. The speed of descent of the load can, obviously be controlled by said hand chain.

What I claim is:

A hoist comprising a hollow cylindrical member, a pair of flanges each extending laterally of and fixedly mounted on an opposite end of said member eccentric to one another, a driving shaft extending through said member between said flanges, said shaft having an integral enlarged end portion extending laterally of and from one of said flanges of a configuration forming a brake drum and hub, means for braking said drum mounted on said hub, a wheel for controlling said shaft connected to said braking means, a load carrying head mounted for free rotation concentric with and about said shaft and extending through said flanges for being rotatably supported thereby, a head gear fixedly connected to said head, a controlling pinion fixedly connected on said driving shaft, a stub shaft rotatably mounted on the other of said flanges, a gear having an intermediate pinion fixedly mounted on said stub shaft and meshing with said head gear, an intermediate wheel of said gear train fixedly connected to said intermediate pinion for rotation therewith and meshing with said controlling pinion and said gears, pinons and stub shaft beng positioned besides said other flange on a side thereof opposite to said member and a third flange having an end of said driving shaft and stub shaft rotatably mounted therein being connected to but spaced from said other flange with said gears, pinions and stub shaft positioned therebetween.

References Cited in the file of this patent

UNITED STATES PATENTS

| | | |
|---|---|---|
| 718,802 | Taylor | Jan. 20, 1903 |
| 2,364,471 | Parker | Dec. 5, 1944 |
| 2,373,048 | Parker et al. | Apr. 3, 1945 |
| 2,403,462 | Schroeder et al. | July 9, 1946 |
| 2,690,240 | Schroeder | Sept. 28, 1954 |

FOREIGN PATENTS

| | | |
|---|---|---|
| 1,050,029 | France | Aug. 26, 1953 |